(12) United States Patent
Luo et al.

(10) Patent No.: US 7,071,982 B2
(45) Date of Patent: Jul. 4, 2006

(54) ADAPTIVE RELATIVE AND ABSOLUTE ADDRESS CODING CMOS IMAGER TECHNIQUE AND SYSTEM ARCHITECTURE

(75) Inventors: Qiang Luo, Gainesville, FL (US); Zhiliang Julian Chen, Plano, TX (US); John G. Harris, Gainesville, FL (US); Steve Clynes, Allen, TX (US); Michael Erwin, Marlborough, MA (US)

(73) Assignee: Texas Instruments Incorporated, Dallas, TX (US)

( * ) Notice: Subject to any disclaimer, the term of this patent is extended or adjusted under 35 U.S.C. 154(b) by 568 days.

(21) Appl. No.: 10/205,322

(22) Filed: Jul. 25, 2002

(65) Prior Publication Data

US 2003/0081134 A1     May 1, 2003

Related U.S. Application Data

(60) Provisional application No. 60/335,221, filed on Oct. 24, 2001.

(51) Int. Cl.
*H04N 5/335* (2006.01)
(52) U.S. Cl. .................................... 348/308; 250/208.1
(58) Field of Classification Search ................. 348/296
See application file for complete search history.

(56) References Cited

U.S. PATENT DOCUMENTS 5,461,425 A * 10/1995 Fowler et al. .............. 348/294
5,541,654 A * 7/1996 Roberts ....................... 348/301
5,801,657 A * 9/1998 Fowler et al. .............. 341/155
6,115,065 A * 9/2000 Yadid-Pecht et al. ....... 348/308
6,229,133 B1 * 5/2001 Hynecek .................. 250/208.1
6,248,991 B1   6/2001 Chen et al.
6,271,785 B1   8/2001 Martin et al.

(Continued)

FOREIGN PATENT DOCUMENTS

JP           04313949 A   * 11/1992

OTHER PUBLICATIONS

B. Doherty "Coparison of Facsimile Data Compression Schemes" IEEE Transactions on Communications, vol. COM-28, No. 12, Dec. 1980 pp. 2023-2024.*

(Continued)

*Primary Examiner*—Ngoc-Yen Yu
*Assistant Examiner*—Dillon Durnford-Geszvain
(74) *Attorney, Agent, or Firm*—Alan K. Stewart; W. James Brady, III; Frederick J. Telecky, Jr.

(57) ABSTRACT

An imaging architecture is provided employing CMOS imaging sensors. The imaging architecture utilizes time domain sampling techniques to extract image data from a photodiode (PD) pixel array. The CMOS imaging architecture associates time index values with firing of CMOS imaging sensors in response to a capture of an image. The time index values correspond to the brightness of the illumination received by the CMOS imaging sensor. The time index value associated with the firing of the CMOS imaging sensor can be stored and employed in reconstruction of the image. The imaging architecture includes systems and methods for reading and compressing imaging data extracted from the PD pixel array.

23 Claims, 5 Drawing Sheets

U.S. PATENT DOCUMENTS

| | | | |
|---|---|---|---|
| 6,320,616 | B1 | 11/2001 | Sauer |
| 6,323,942 | B1 | 11/2001 | Bamji |
| 6,330,030 | B1 * | 12/2001 | O'Connor .................... 348/297 |
| 6,365,886 | B1 * | 4/2002 | Ang et al. ............... 250/208.1 |
| 6,377,303 | B1 * | 4/2002 | O'Connor .................... 348/308 |
| 6,498,576 | B1 * | 12/2002 | Tian et al. .................. 341/155 |
| 6,660,989 | B1 * | 12/2003 | Guo et al. ............... 250/208.1 |
| 6,831,689 | B1 * | 12/2004 | Yadid-Pecht ................ 348/297 |
| 6,847,398 | B1 * | 1/2005 | Fossum ....................... 348/296 |
| 6,927,793 | B1 * | 8/2005 | Seitz et al. .............. 348/230.1 |

OTHER PUBLICATIONS

Orly Yadid-Pecht "Wide-dynamic-range Sensors" SPIE Opt. Eng. 38(10), Oct. 1999, pp. 1650-1660.*

Spros Kavadias, Bart Dierickx, Danny Scheffer, etc. *A Logarithmic Response CMOS Image Sensor with On-Chip Calibration*. IEEE Journal of Solid State Circuits, vol. 35, No. 8, 2000, pp. 1146-1152.

Steven Decker, R. Daniel McGrath, Kevin Brehmer, etc. *A 256×256 CMOS Imaging Array with Wide Dynamic Range Pixels and Column-Parallel Digital Output*. IEEE Journal of Solid State Circuits, vol. 33, No. 12, 1998, pp. 2081-2090.

David X.D. Yang, Abbas El Gamal, Body Powler, etc. *A 640×512 CMOS Image Sensor with Ultrawide Dynamic Range Floating-Point Pixel-Level ADC*. IEEE Journal of Solid State Circuits, vol. 34, No. 12, 1999, pp. 1821-1834.

Woodward Yang. *A Wide-Dynamic-Range Low-Power Photosensor Array*. ISSCC94, pp.230-231.

Eugenio Culurciello, Ralph Etienne-Cummings, Kwabena Boahen. *Arbitrated Address Event Representation Digital Image Sensor*. ISSCC 2001, pp. 92-93.

Lisa G. McIlrath. *A Low-Power Low-Noise Ultrawide-Dynamic-Range CMOS Imager with Pixel-Parallel A/D Conversion*. IEEE Journal of Solid State Circuits, vol. 36, No. 5, 2001, pp. 846-853.

R. Kishore K., *Time Domain Quantization CMOS Image Sensor System Design and Architecture*, Master Thesis of University of Florida, 2001.

Ruffin VanRullen, Simon J. Thorpe. *Rate Coding Versus Temporal Order Coding: What The Retinal Ganglion Cells Tell The Visual Cortex*. Neural Computation 13, 2001, pp. 1255-1283.

R.C. Gonzalez, R.E. Woods, *Digital Image Processing*, Addison-Wesley Publishing Company, 1992, pp. 340-363.

A. Roychaudhuri, et al., *"Substrate Bias Dependence of Short-Channel MOSFET Threshold Voltage—A Novel Approach"*, IEEE Trans. Electron Devices, vol. 35, No. 2, pp. 167-173, Feb. 1988.

C.J.B. Fayomi, G.W. Roberts and M. Sawan, *Low Power/Low Voltage High Speed CMOS Differential Track and Latch Comparator with Rail-to-Rail Input*, ISCAS 2000, pp. 653-656, May 28, 2000, Geneva, Switzerland.

* cited by examiner

| T2 | T0 | T1 | T4 | T4 | T4 | T4 | T1 |
|----|----|----|----|----|----|----|----|
| T2 | T0 | T0 | T4 | T4 | T1 | T0 | T0 |
| T0 | T0 | T0 | T1 | T3 | T3 | T0 | T1 |
| T1 | T1 | T0 | T0 | T3 | T3 | T0 | T0 |
| T2 | T1 | T1 | T4 | T4 | T0 | T0 | T0 |
| T2 | T1 | T1 | T4 | T4 | T1 | T1 | T0 |
| T1 | T1 | T0 | T0 | T0 | T1 | T2 | T2 |
| T0 | T2 | T2 | T2 | T0 | T0 | T1 | T1 |

ADAPTIVE RELATIVE AND ABSOLUTE ADDRESS CODING CMOS IMAGER TECHNIQUE AND SYSTEM ARCHITECTURE

CROSS REFERENCE TO RELATED APPLICATIONS

The present application claims the benefit of U.S. Provisional Patent Application Ser. No. 60/335,221, filed Oct. 24, 2001, ADAPTIVE RELATIVE AND ABSOLUTE ADDRESS CODING CMOS IMAGER TECHNIQUE AND SYSTEM ARCHITECTURE, and which is incorporated herein by reference.

TECHNICAL FIELD

The present invention relates to imaging and more particularly to a CMOS imager technique and system architecture.

BACKGROUND OF INVENTION

Imaging systems have been employed for use in a variety of high tech applications, such as medical devices, satellite and telescope apparatus. Recently, imaging systems have been utilized in a variety of additional applications such as digital cameras, computer scanners and camcorders. A majority of these applications have employed charge-coupled-devices (CCDs) to build the underlying image sensors. However, CCD-based image sensors are limited or impractical for use in many consumer applications. For example, CCDs cannot be fabricated employing conventional Complimentary-Symmetry Metal-Oxide Semiconductor (CMOS) fabrication processes. Therefore, CCD imagers cannot be integrated with other chips that provide necessary support functions, but require independent support chips to perform, for example, CCD control, A/D conversion, and signal processing. The operation of CCD imagers also require multiple high supply voltages (e.g., 5V–12V) resulting in higher power consumption. As a result, the costs for the CCD image sensor and the system employing the sensor remain high. Additionally, since the current to charge the CCDs is high, CCDs are not well suited for portable applications.

CMOS imagers have offered improvements in functionality, power and cost in many applications (e.g., digital video, digital cameras). A CMOS type image sensor includes a photodiode or phototransistor employed as a light detecting element. The output of the light detecting element is an analog signal whose magnitude is approximately proportional to the amount of light received by the elements. The magnitude of the analog signal can be measured for each photo diode representing a pixel and stored to provide an entire stored image. CMOS imagers utilize less power, have lower fabrications costs and offer high system integration compared to imagers made with CCD processes. Additionally, CMOS imagers have the advantage that they can be manufactured using similar processes employed to those commonly used to manufacture logic transistors, such that the necessary CMOS imager support functions can be fabricated on the same chip.

The potential to achieve wide dynamic range imaging of CMOS image sensors have also attracted attention in the field of electronic imaging that was previously dominated by CCDs. Several implementations have been derived to improve the dynamic range of conventional CMOS imagers that implement voltage domain sampling. Some of these methods include logarithmic response CMOS imagers, multiple frame capture techniques, and floating-point pixel-level ADC imagers. Logarithmic response CMOS imagers incorporate logarithm compression at the photodiode level to achieve wide dynamic range. The logarithmic response technique suffers from the problem of fixed pattern noise due to the device mismatches, and poor sensitivity and local contrast. Multiple frame capture techniques implement a lateral overflow gate to increase pixel dynamic range. This technique suffers from mismatch in the lateral overflow transistor gate-drain overlap capacitance. Also it requires capturing multiple frames and complex reconstruction processing. Furthermore, its logarithmic compression curve strongly reduces image contrast. Floating-point pixel-level ADC imagers require large memory to store the data and require a complex reconstruction process.

Recently, some researchers have started to explore time domain sampling techniques in order to overcome the inherent limitations of conventional CMOS imagers. Voltage-to-frequency conversion photosensors provide a high dynamic range. However, the readout process of the photosensor array takes a very long time. Thus, this technique is not applicable for many implementations. An arbitrated address event representation digital image sensor technique utilizes row and column arbiters to send out the pixels according to the firing order. This technique requires a high-resolution timer and a large frame buffer. Pixel-parallel analog-to-digital (A/D) conversion CMOS imagers implement a free-running photocurrent-controlled oscillator to give a first-order $\Sigma$-$\Delta$ sequence. This technique requires a constant reference voltage and the imaging procedure requires a full second of time. A time domain quantization sensing (TDQS) technique uses the idea of digitizing a sensing pixel analog value by quantizing it in the time domain. A scene is sampled multiple times in the TDQS system and a large memory is needed to store the data. Also, since a pixel is read off-chip multiple times, the power consumption of the system is substantial.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a CMOS imaging architecture employing time domain sampling techniques to extract image data from a photodiode (PD) pixel array. The PD pixel array includes a plurality of CMOS pixel sensors. The CMOS pixel sensors include photodiodes that measure the intensity or brightness of illumination received by the CMOS pixel sensor. The CMOS pixel sensor has an unfired state and a fired state. A time index value is associated with the time that the CMOS pixel sensor achieves a fired state upon capturing a portion of an image. The time index value corresponds to the brightness of the illumination received by the CMOS pixel sensor. The CMOS imaging architecture includes a variety of techniques for scanning the PD pixel array and associating time index values with the firing of the plurality of CMOS pixel sensors. The time index values associated with the firing of the CMOS pixel sensors can be stored and employed in reconstruction of the image. The imaging architecture includes systems and methods for reading and compressing image data extracted from the PD pixel array.

In one aspect of the invention, the CMOS pixel sensor includes a photodiode coupled to a comparator. A voltage is applied to the photodiode upon resetting of the PD pixel array. The photodiode then discharges when illumination from incident light is received by the photodiode, which causes the photodiode voltage to decrease. The photodiode voltage is compared to a reference voltage. When the photodiode voltage reaches the reference voltage, the CMOS pixel sensor fires. The rate of the photodiode voltage drop is proportional to the brightness of the incident light received by the photodiode. Therefore, the brighter the incident light that the photodiode receives, the faster that the CMOS pixel sensor will fire. During a scan cycle of a PD pixel array, the output of the CMOS pixel sensors can be employed as write enable lines to a memory array, such that a time index value is written to a memory location associated with a fired CMOS pixel sensor. The PD pixel array can be scanned repeatedly until all the pixels fire or until a predetermine time expires.

In another aspect of the invention, a serial readout device is coupled to the PD pixel array. The serial readout device forms a parallel in serial out (PISO) shift register based on a logic configuration of a row of the PD pixel array during a scan of that row. Addresses associated with the CMOS pixel sensors are shifted serially out of the serial readout device. In one aspect of the invention, the serial readout device employs an absolute address coding (AAC) technique, such that addresses of fired CMOS pixel sensors are shifted out of the serial device. In another aspect of the invention, the serial readout device employs a relative address coding (RAC) technique, such that addresses of CMOS pixel sensors having transient logic states are shifted out of the serial device. In yet another aspect of the invention, the serial readout device combines the AAC technique and the RAC technique to optimize the advantages from both techniques and to mitigate the disadvantages of both techniques.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention relates to an imaging architecture employing CMOS imaging sensors. The imaging architecture utilizes time domain sampling techniques to extract image data from a photodiode (PD) pixel array. The CMOS imaging sensors have a fired state and an unfired state. A time index is associated with the firing of a CMOS imaging sensor. The time index value corresponds to the brightness of the illumination received by the CMOS imaging sensor. The time index value associated with the firing of the CMOS imaging sensor can be stored and employed in reconstruction of the image. The imaging architecture employs a variety of techniques for reading and compressing imaging data from the PD pixel array.

Figure 1:
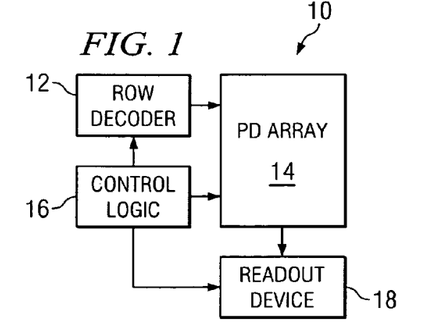
FIG. 1 illustrates a block diagram of an imaging system in accordance with an aspect of the present invention.

FIG. 1 illustrates an imaging system 10 in accordance with an aspect of the present invention. The imaging system 10 is a time domain sampling system that determines when a CMOS pixel sensor has reached a predetermined threshold voltage, which is indicated as a fired state. The imaging system 10 includes a photodiode (PD) pixel array 14 that is comprised of a plurality of CMOS pixel sensors (e.g., 256, 16,384, 65,536) arranged in rows and columns. The PD pixel array 14 can be a variety of different array sizes (e.g., 16×16, 128×128, 256×256). A row decoder 12 is coupled to the PD pixel array 14. The row decoder 12 selects a row of pixels sensors for sampling or reading by a readout device 18. The readout device 18 determines which pixels in a row have fired, associates a time with the firing of the fired pixels, and causes the time associated with the firing of the fired pixels to be stored in memory (e.g., on-chip memory, off-chip memory) for later reconstruction of the captured image.

A variety of techniques can be employed to reconstruct the image using a time index table that associates a brightness or illumination intensity to a firing time of a pixel. The readout device 18 can be an on-chip memory device directly coupled to the pixels of the PD pixel array 14. Alternatively, the readout device 18 can include logic for transmitting time values and/or address values in parallel or serially to an off-chip memory device.

A control logic device 16 is coupled to the PD pixel array 14, the row decoder 12 and the readout device 18. The control logic device 16 controls the sampling of the PD pixel array 14 using the row decoder 12 and a column decoder (not shown). The control logic device 16 can also control the readout of the PD pixel array 14. The column decoder (not shown) can be integrated into the control logic device 16 or the readout device 18. The control logic device 16 controls the sampling of the PD pixel array 14, and provides a time associated with the fired pixels in the PD pixel array 14. One of the simplest readout schemes is to read out the whole photodiode (PD) pixel array at each sampling time instance (or a frame). However, this is impractical for larger arrays due to the required pin size and the high frequency clocks required.

In one aspect of the invention, the control logic device 16 causes the execution of a raster scan of the PD pixel array 14, and repeats this raster scan until all of the pixels or pixel sensors have been determined to be fired, or a predetermined period has expired. Devices that do not fire are assigned a default value and assumed to be dark. The control logic device 16 can include a clock, a counter or timer to associate a firing time to the fired pixels. It is to be appreciated that the control logic device 16 can provide a firing time associated with each row or a single firing time associated with the sampling of the PD pixel array 14 with row sampling times added to the single firing time.

Figure 2:
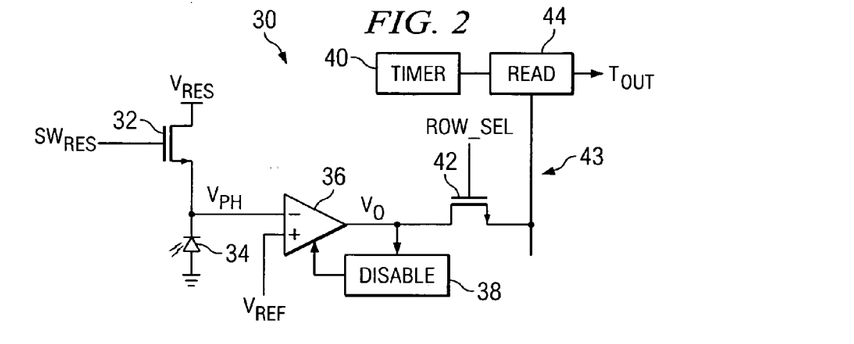
FIG. 2 illustrates a schematic block diagram of a digital pixel sensor circuit in accordance with an aspect of the present invention.

FIG. 2 illustrates a digital pixel sensor circuit 30 in accordance with an aspect of the present invention. The digital pixel sensor circuit 30 includes a reset transistor 32 coupled to a photodiode 34. The digital pixel sensor circuit 30 is employed in a time domain sampling system. The photodiode 34 is coupled to a negative terminal of a comparator 36. A reference voltage $V_{REF}$ is coupled to the positive terminal of the comparator 36. The reference voltage $V_{REF}$ can be a fixed or a variable reference voltage. A software reset signal ($SW_{RES}$) closes the reset transistor 32 to provide a voltage reset signal ($V_{RES}$) to the photodiode 34. The voltage reset signal ($V_{RES}$) provides a photodiode voltage VPH to the photodiode 34. The software reset signal ($SW_{RES}$) then changes state opening the reset transistor 32. Incident light discharges the photodiode 34 and causes the photodiode voltage $V_{PH}$ to decrease. When the $V_{PH}$ drops to the value of reference voltage $V_{REF}$, the output $V_O$ of the comparator 36 will toggle. The rate of the photodiode voltage drop is proportional to the brightness of the incident light or illumination is received by the photodiode 34. Therefore, the brighter the incident light that the photodiode 34 receives, the faster the comparator 36 will toggle.

The output of the comparator 36 is coupled to a row select transistor 42. A row-select signal (ROW_SEL) will connect the comparator output $V_O$ to a column bus 43 when it is high, or disconnect the comparator output $V_O$ from the column bus 43 when it is low through the row select transistor 42. The comparator output $V_O$ from the column bus 43 provides a write enable line to a readout device 44, such as a memory device. A disable circuit 38 is connected to the output of the comparator 36 and disables the comparator 36 after the output transition of the comparator 36 is detected. The readout device 44 then reads a timer 40 or counter value and generates a fired time output $T_{OUT}$. The fired pixels are reset to an "unfired" status by the disable circuit 38 in the next sampling instance and held at that state until the end of the sampling.

Figure 3:
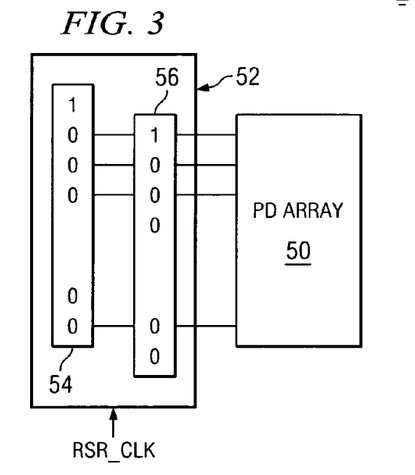
FIG. 3 illustrates a block diagram of row decoder employing a disable process in accordance with an aspect of the present invention.
Figure 4:
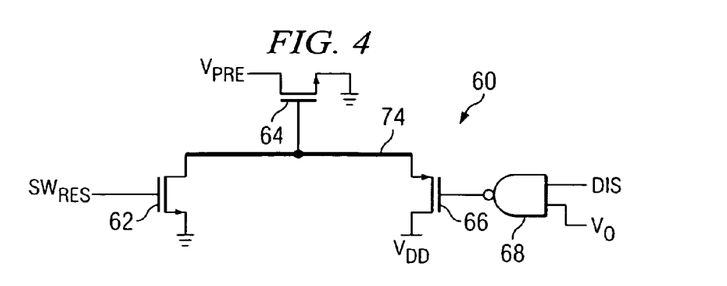
FIG. 4 illustrates a schematic diagram of a disable circuit in accordance with an aspect of the present invention.

FIGS. 3–4 illustrate devices associated with a disable process in accordance with an aspect of the present invention. FIG. 3 illustrates a block schematic diagram of a row decoder 52 for employing disable processing. The row decoder 52 is coupled to a photodiode array 50. The row decoder 52 includes a first shift register 56 for pixel or photodiode row selection. A second shift resister 54 is provided for disabling fired pixels of a row. In order not to lose any information, a fired pixel is acknowledged before it is disabled. Thus, the disable processing is assigned after the row has been selected and information of fired pixels in this row has been transmitted. Also, in order to keep the disable information "unfired" until the end of the sampling, a latch can be used to store the disable information. The bit values of the shift registers are wired in at the beginning of each sampling instance. The first and second shift registers 56 and 54 can be controlled by the same clock (RSR_CLK).

The first and second shift registers 54 and 56 have one more row than the pixel array rows of the photodiode array 50. The disable shift register 54 has one row higher than the photodiode array 50, and the row select shift register 56 has one row lower than the photodiode array 50. This arrangement guarantees that no rows of the photodiode array 50 will be ignored from the disable processing. The last bit of the second shift register 56 works as an end frame bit. An end frame bit of "0" indicates that the raster scan is in process. An end frame bit of "1" indicates that the raster scan is finished or the current frame has been sampled and the new sampling can begin. The fired pixels in the last row of the PD array 50 are disabled when the end frame bit of "1" is detected.

FIG. 4 illustrates an exemplary disable circuit 60 that can be employed with the row decoder of FIG. 3 in accordance with an aspect of the present invention. The disable circuit 60 includes a reset transistor 62, a disable transistor 64 and a control transistor 66. The reset transistor 62 has a gate coupled to a software reset signal ($SW_{RES}$), a source coupled to a ground and a drain coupled to a disable node 74. The disable transistor 64 has a gate coupled to the disable node 74, a source coupled to ground and a drain coupled to an internal preamplifier signal of a digital pixel sensor comparator (not shown). The control transistor 66 has a drain coupled to a supply voltage $V_{DD}$, a source coupled to the disable node 74 and a gate coupled to an output of a NAND gate 68. The input to the NAND gate 68 includes a disable signal (DIS) and an output signal $V_O$ from the digital pixel sensor comparator (not shown).

At the start of sampling, $SW_{RES}$ is high and the reset transistor 62 is closed. After a row is selected, the selected row enters a "disable processing" state at the next clock cycle. If a pixel is fired, a logic "1" will be placed at the gate of the control transistor 66 by a latch of the pixel sensor. The control transistor will turn "ON" placing $V_{DD}$ at the gate of the disable transistor 64. The disable transistor 64 will turn "ON" pulling the output of a preamplifier of the comparator to ground, and sequentially causing the output of the whole comparator to be held in an unfired state (e.g., held in a high state). The latch will keep this state until the end of the sampling because there is no other input to change the latch status.

Figure 5:
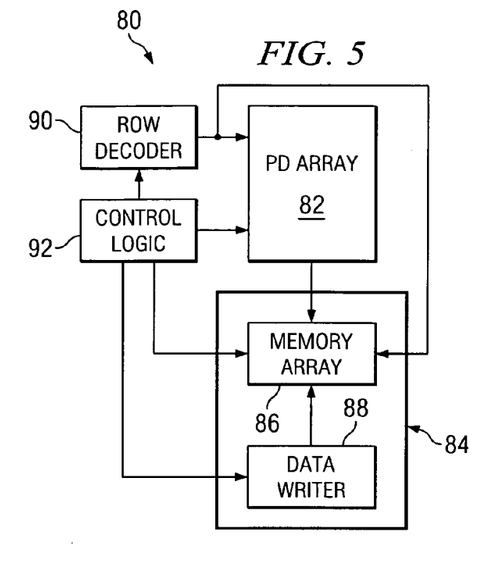
FIG. 5 illustrates a block diagram of an imaging system employing an on-chip memory in accordance with an aspect of the present invention.

FIG. 5 illustrates an imaging system 80 employing an on-chip memory array 84 in accordance with an aspect of the present invention. The imaging system 80 is a time domain sampling system that determines when a pixel sensor has reached a predetermined threshold voltage, which is indicated as a fired state. The imaging system 80 includes a photodiode (PD) pixel array 82 that is comprised of a plurality of CMOS pixel sensors arranged in rows and columns. The PD pixel array 82 can be a variety of different array sizes (e.g., 16×16, 128×128, 256×256). A row decoder 90 is coupled to the PD pixel array 82. The row decoder 90 selects a row of pixels sensors for sampling or reading by a readout device 84. The readout device 84 includes a memory array 86 operative for storing pixel fired time values, and a data writer 88 operative for writing pixel fired time values into the memory array 86.

A control logic device 92 is coupled to the PD pixel array 82, the row decoder 90, the memory array 86 and the data writer 88. The control logic device 92 controls the sampling of the PD pixel array 82 using the row decoder 90 and a column decoder (not shown). The control logic device 92 can also control the readout of the PD pixel array 82. The control logic device 92 provides a time associated with fired pixels to the memory array 86 using the data writer 88 through a clock, counter or timer. The output of the fired pixel can be employed as a write enable line of a respective memory location in the memory array 86. The control logic device 92 causes the execution of a raster scan of the PD pixel array 82, and repeats this raster scan until all of the pixels have been determined to be fired, or a predetermined period has expired. Devices that do not fire are assigned a default value and assumed to be dark.

Figure 6:
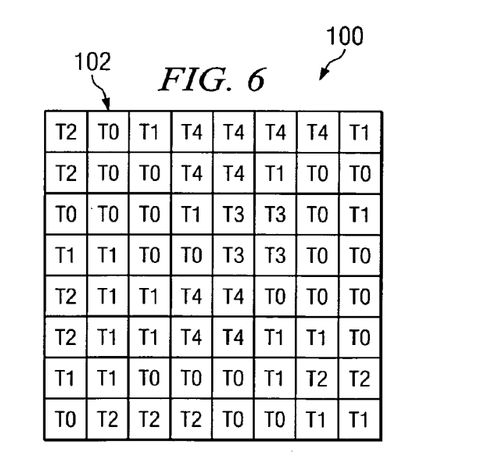
FIG. 6 illustrates a block diagram of an example of contents of a memory array in accordance with an aspect of the present invention.

FIG. 6 illustrates a simple example of contents of a memory array 100 having a plurality of memory locations 102 arranged as an 8×8 memory block in accordance with an aspect of the present invention. The memory array example illustrates the contents of the memory cells 102 after four raster scan cycles. The memory cells 102 of the memory array 100 are initialized with a time value $T_0$ prior to a raster scan of a PD pixel array. Upon initialization, the photodiode array 100 captures an image of varying brightness. The pixels that receive the brightest illumination fire first in time. After the image is captured, the photodiode array is scanned row by row, and a time value $T_1$ is stored for each fired pixel. Memory cells with the time value $T_1$ will represent the brightest pixels. The fired pixels are then disabled.

The photodiode array is then raster scanned through a second cycle and a time value $T_2$ is stored in memory cells 102 of the memory array 100 for each pixel fired in the second scan. The pixels fired in the second cycle are then disabled. The photodiode array is then raster scanned through a third cycle and a fourth cycle with time values $T_3$ and $T_4$ stored in memory cells 102 of the memory array 100 for each pixel fired in the third and fourth scan, respectively. The pixels fired in the third cycle and the fourth cycle are disabled after their respective scans. Assuming that the fourth cycle scan is the final scan due to a time period associated with reading of the image expiring, the pixels that did not fire have memory cells with time values of $T_0$. Memory cells with the time value $T_0$ will represent the darkest pixels.

In an on-chip memory system, the readout architecture is related to the size of the PD pixel array. Different readout schemes can be implemented for different size PD pixel arrays. The worst case of time domain sampling system is that the whole array should be read out within the shortest time interval. This limits the maximum size of a PD pixel array to be based on the size of the clock executing the sampling.

Figure 7:
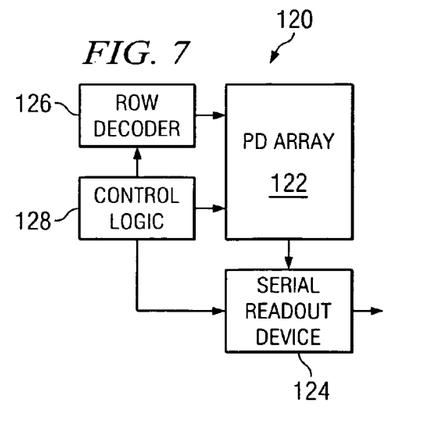
FIG. 7 illustrates a block diagram of an imaging system employing a serial readout device in accordance with an aspect of the present invention.

FIG. 7 illustrates an imaging system 120 that employs a serial readout device 124 in accordance with an aspect of the present invention. The imaging system 120 is a time domain sampling system that determines when a pixel sensor has reached a predetermined threshold voltage, which is indicated as a fired state. The imaging system 120 includes a photodiode (PD) pixel array 122 that is comprised of a plurality of CMOS pixel sensors arranged in rows and columns. A row decoder 126 is coupled to the PD pixel array 122. The row decoder 122 selects a row of pixels sensors for sampling or reading by the serial readout device 124. The serial readout device 124 determines which pixels in a row have fired, associates addresses with the firing of the fired pixels, and causes a time associated with the firing of the fired pixels and addresses corresponding to the fired pixels to be transmitted serially to a storage device (e.g., off-chip) for later reconstruction of the captured image.

A control logic device 128 is coupled to the PD pixel array 122, the row decoder 126 and the serial readout device 124. The control logic device 128 controls the sampling of the PD pixel array 122 using the row decoder 126 and a column decoder (not shown). The control logic device 128 can also control the transmission of times and addresses of fired pixels. The column decoder (not shown) can be integrated into the control logic device 128 or be a separate device that controls the sampling of pixels in a row. The control logic device 128 causes the execution of a raster scan of the PD pixel array 122, and repeats this raster scan until all of the pixels have been determined to be fired, or a predetermined period has expired. Devices that do not fire are assigned a default value and assumed to be dark.

The control logic device 128 can include a clock, a counter or time to provide the associated firing time to fired pixels. A time index is associated with each scan, and the addresses of the fired pixels are transmitted serially from the serial readout device 124. A marker address (e.g., 000) is employed to indicate an end of a row. Alternatively, the control logic device 128 can determine the end of the row when the scan is incremented to the next row. TABLE I illustrates an exemplary structure of the send-out data of a 32×32 pixel array with a total scan sample of S.

TABLE I

Time index 0

Row1
Column address 1
Column address 2
.
.
.
Column address n1
00000
Row 2
Column address 1
Column address 2
.
.
.
Column address n2
00000
Row 3
.
.
.
00000
Row 32
00000

Time index 1

Row 1
Column address 1
.
.
.

Time index S

.
.
.

It is to be appreciated that only "fired" and "unfired" are the two states of the pixels at each sampling time instance. Thus, logic "1" and "0" can be used to describe these states.

Therefore, the frame at one sampling time instance is a binary image which is suitable for some types of compression. In another words, the multiple sampling actually decomposes the multilevel image into a series of binary images. Each binary image can be compressed via one of several well-known binary compression methods, such as constant area coding (CAC), 1-D run-length coding (RLC), and predictive differential quantization (PDQ). Since raster scanning is adopted as the scan scheme in time domain sampling system, one-dimensional compression method is suitable for the readout.

The present invention proposes new compression methods to send out the addresses that identify the fired pixels. They are relative address coding (RAC), absolute address coding (AAC), and a combination of RAC and AAC. AAC transmits addresses of only fired pixels, while RAC transmits addresses of adjoining pixels in a row in which a transience occurs. The combination of RAC and AAC employ the advantages of each method based on the states of the pixels in a row.

Figure 8:
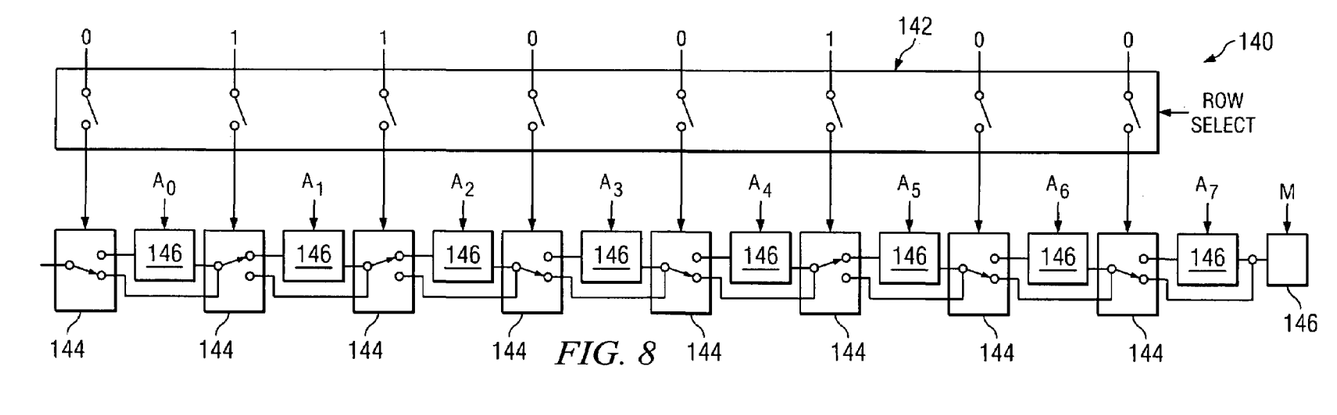
FIG. 8 illustrates a schematic diagram of a serial readout device employing an absolute address coding technique in accordance with an aspect of the present invention.

FIG. 8 illustrates a serial readout circuit 140 that employs absolute address coding (AAC) in accordance with an aspect of the present invention. The serial readout circuit 140 includes a row select switch bank 142 that couples a row of pixel sensors (not shown) to the serial readout circuit 140. The output of a respective pixel is connectable to a respective register switch 144. The serial readout circuit 140 includes a plurality of DFFs 146 connected to a respective register switch 144. The input to each DFF 146 includes the address of a corresponding pixel. A fired pixel is represented by a logic state "1", while an unfired pixel is represented by a logic state "0". The fired pixels cause the associated register switch 144 to include the respective DFF 146 in an address shift register circuit. The state of the output of the pixel determines the state of the output switch 144. The absolute address coding circuit 140 will send out the address ($A_0$–$A_7$) or column address of those pixels that fired. In each row, the fired pixel will connect the corresponding column DFFs 146 to form a shift register.

A logic "1" output will connect a DFF 144 to the shift register, while a logic "0" output will disconnect a DFF 144 from the shift register. When the shift register is built up, the addresses will be shifted of the shift register from right to left (small address to big address). This is a parallel in serial out (PISO) shift register scheme. In the example of FIG. 8, the row vector has the elements of {0,1,1,0,0,1,0,0}. In this scheme, addresses $A_1$, $A_2$ and $A_5$ will be shifted from the shift register formed by the readout device 140. Finally, when an end-mark M (e.g., 000) is shifted out, the transmission completes. This end-mark M helps distinguish row address from the column address in the received data.

Figure 9:
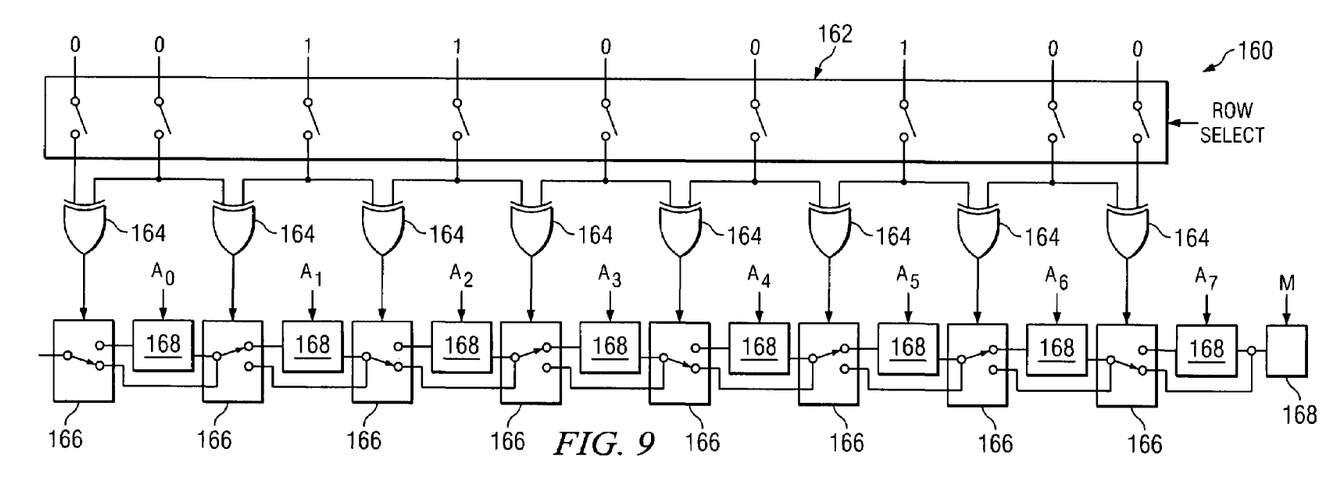
FIG. 9 illustrates a schematic diagram of a serial readout device employing a relative address coding technique in accordance with an aspect of the present invention.

FIG. 9 illustrates a serial readout circuit 160 that employs relative address coding (RAC) in accordance with an aspect of the present invention. The serial readout circuit 160 includes a row select switch bank 162 that couples a row of pixel sensors to the serial readout circuit 160. Adjacent pixel outputs are provided to a respective exclusive "OR" (XOR) gate 164. The output of a XOR gate 164 is connected to a respective register switch 166. The serial readout circuit 160 includes a plurality of DFFs 168 connected to a respective register switch 166. The input to each DFF 168 includes the address ($A_0$–$A_7$) of a corresponding pixel. A fired pixel is represented by a logic state "1", while an unfired pixel is represented by a logic state "0". A transience in adjacent pixels cause the associated register switch 166 to include the respective DFF 168 in an address shift register circuit. The state of the respective XOR gate 164 determines the state of the respective register switch 166. The relative address coding circuit 160 will send out the address of those pixels that have a transient from a "0" state to a "1" state or from a "1" state to a "0" state in a row.

An extra logic value of "0" is placed at the head of the vector to help determine the "1" and "0" order. Thus, the first address sent out is the position where the first "1" locates. The second address will be the position where "0" locates. The third address is the address of "1" again, and so on. For example, assume a row vector has the elements of {0,1,1,0,0,1,0,0}, and the RAC scheme will send out the addresses $A_1$, $A_3$, $A_5$ and $A_6$. The difference between two adjacent sent-out addresses is the successive "run" length of "1" or "0". This helps transmit data within limit bandwidth and reduce the power consumption. Finally, when the end-mark M is shifted out, the transmission completes. This end-mark M helps distinguish row address from the column address in the received data.

It is clear this readout scheme provides efficient scanning and has low power consumption. The idea behind the RAC scheme is to detect the boundaries of successive "1"s. The saved transmission is different according to different successive "1" cases. This is illustrated in TABLE II. However, if "1"s are scatted among "0"'s, more pixels will be picked than is necessary. Since two pixels need to be picked to identify the boundary, for only one "1" case, the earning is −1, for two successive "1" case, there is not loss or earning, and for N successive "1" case where N is greater than 2, the earning is (N−2) and the bigger N is the more savings that is provided. Therefore, the RAC scheme is efficient when long successive "1"'s exist in the bit plane.

TABLE II

| Number of successive "1" | Number of picked pixels | Number of savings |
| --- | --- | --- |
| 1 | 2 | −1 |
| 2 | 2 | 0 |
| 3 | 2 | 1 |
| 4 | 2 | 2 |
| . | . | . |
| . | . | . |
| . | . | . |
| N | 2 | N − 2 |

The RAC scheme has the advantage of removing redundancy when successive "1"'s are not less than 2. While, the AAC scheme is very suitable when single "1" is embedded in "0"'s, but does not remove any redundancy when successive "1"'s are more than 2. The combination of these two methods (R&AAC) will have both the advantages and compensate for the disadvantages. In the combination method, the "010" pattern, which denotes single "1" case implemented employing the AAC method, while the RAC method is implemented for all other cases.

Figure 10:
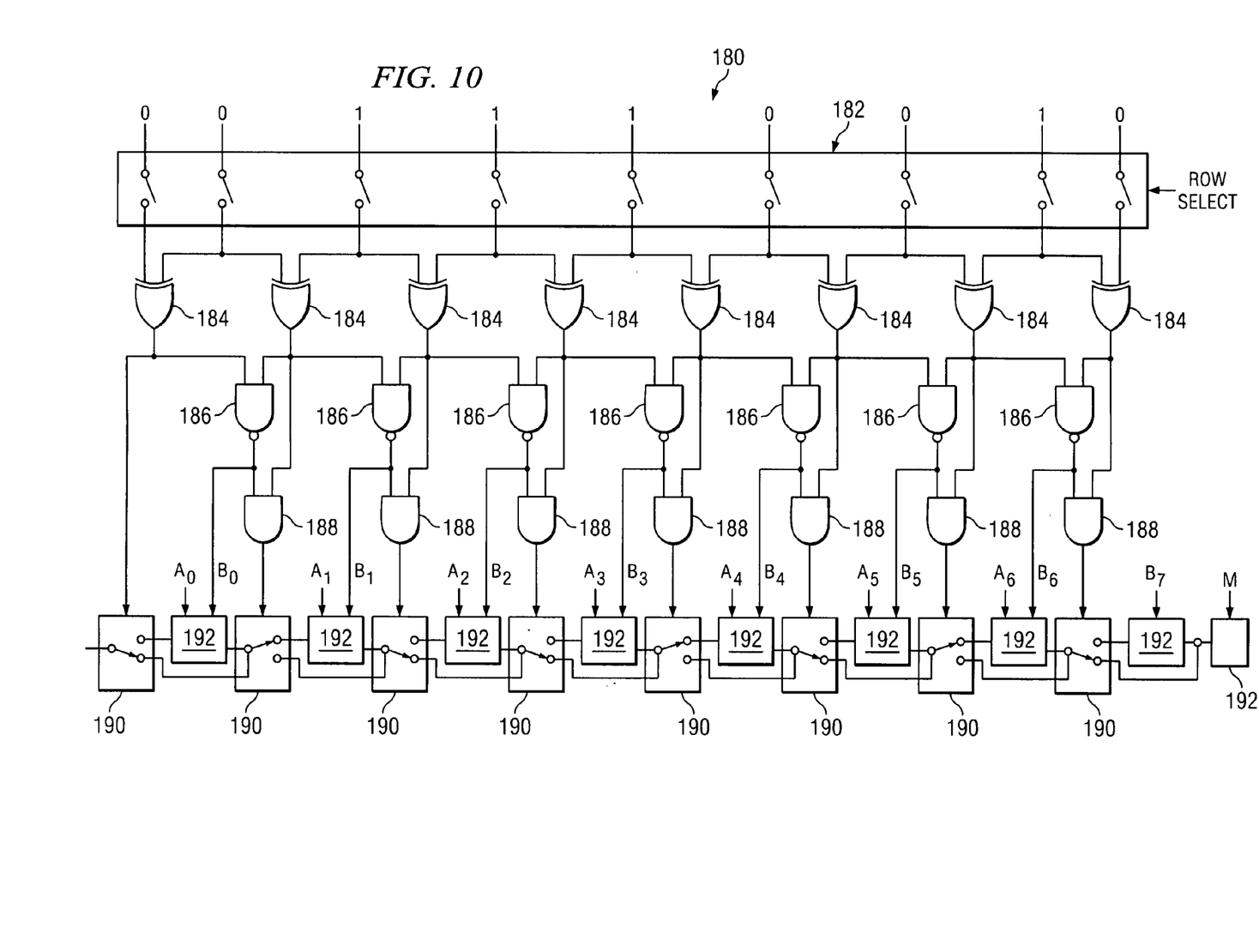
FIG. 10 illustrates a schematic diagram of a serial readout device employing a combination of an absolute address coding technique and a relative address coding technique in accordance with an aspect of the present invention.

FIG. 10 illustrates a serial readout circuit 180 that employs a combination of relative address coding and absolute address coding (R&AAC) in accordance with an aspect of the present invention. The serial readout circuit 180 includes a row select switch bank 182 that couples a row of pixel sensors to the serial readout circuit 180. Adjacent pixel outputs are provided to a respective XOR gate 184. The adjacent outputs of the XOR gates 184 are connected to respective NAND gates 186. The outputs of the NAND gates 186 are provided as input to respective AND gates 188. Additionally, the outputs of respective XOR gates 184 are provided as input to the respective AND gates 188. The serial readout circuit 180 includes a plurality of DFFs 192 connected to a respective register switch 190. The input to each DFF 192 includes the address ($A_0$–$A_7$) of a corresponding pixel in addition to a distinguish bit from the output of a respective NAND gate 186. A fired pixel is represented by a logic state "1", while an unfired pixel is represented by a logic state "0".

The example illustrated in FIG. 10 provides a row vector {0, 1, 1, 1, 0, 0, 1, 0}. The first "0" in the row vector is the extra logic value as used in RAC. The XOR gate 184 is used to detect the transient change of the bit row. The outputs of XOR gates 184 are used in RAC scheme. The two-input NAND gates 186 are used to represent the "010" pattern of the AAC scheme, and to separate the "010" scheme from other patterns. Only the pattern of "010" has successive "1" XOR output. The XOR output of the bit vector in FIG. 10 is {0, 1, 0, 0, 1, 0, 1, 1}. Finally, the XOR gate output and NAND gate outputs pass through a respective AND gate 188 to control the switches 190 of the shift register. A logic "1" output of the AND gate 188 will connect the corresponding DFF 192 to the shift register. A logic "0" output of the AND gate 188 will disconnect the corresponding DFF 192 from the shift register. To distinguish RAC output from AAC output, a distinguish bit $B_0$–$B_7$ is provided. In the example, a "1" is used to indicate that the address is a RAC output, and a "0" is used to indicate that the address is an AAC output. The distinguish bit $B_7$ of the last pixel and an end mark M are set to 0.

The XOR gates 184 fulfill the RAC scheme, the NAND gates 186 fulfill the AAC scheme, and lastly the AND gates 188 combine these two schemes together. Compared with RAC scheme, R&AAC scheme has two more gate delays. Compared with AAC scheme, R&AAC scheme has three more gate delays, but it is more efficient that either RAC or AAC scheme alone. Each R&AAC output (the output at an AND gate) is the logic output of three successive inputs. Only the patterns of "001" and "110" have logic "1" output. Thus, the R&AAC logic can be described by EQ. 1 below:

$$\overline{(a \otimes b) \cdot (b \otimes c)} \cdot (b \otimes c) \qquad \text{EQ. 1}$$

which can be simplified as follows to EQ. 2:

$$\overline{(a \otimes b)} \cdot (b \otimes c) \qquad \text{EQ. 2}$$

Therefore, inverters can be used to replace the NAND gates 186 in FIG. 10 to simplify the circuit. The distinguish bits for RAC and AAC are inverted to 0 and 1, respectively, as opposed to 1 and 0, as illustrated in FIG. 10.

Figure 11:
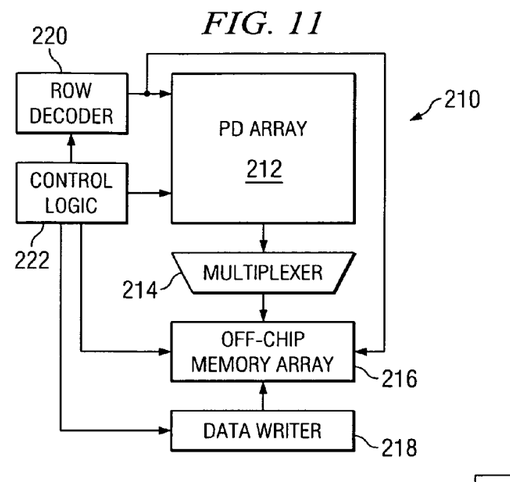
FIG. 11 illustrates a block diagram of an imaging system employing a multiplexer for transmitting addresses in parallel in accordance with an aspect of the present invention.

The above proposed readout schemes use parallel input serial output (PISO) shift registers as the output engine. In another aspect of the invention, a parallel output is employed to transmit the output data employing multiplexing. A multiplex scheme is illustrated in FIG. 11. This scheme adopts the idea of on-chip memory that uses the output of each pixel as the write-enable signal to enable the write processing of time index to the memory. However, the memory is an off-chip memory and multiplexers are used to send out the pixel outputs based on the pin limit of the package. The, data that can be transmitted and the transmission speed of the data will be at least partially dependent on the available output pins on the package. The multiplex scheme also reduces the size of the off-chip memory necessary to store the sampling time index.

FIG. 11 illustrates an imaging system 210 employing a parallel output and multiplexing scheme in accordance with an aspect of the present invention. The imaging system 210 is a time domain sampling system that determines when a CMOS pixel sensor has reached a predetermined threshold voltage, which is indicated as a fired state. The imaging system 210 includes a photodiode (PD) pixel array 212 that is comprised of a plurality of pixel sensors arranged in rows and columns. The PD pixel array 212 can be a variety of different array sizes. A row decoder 220 is coupled to the PD pixel array 212. The row decoder 220 selects a row of pixels sensors for sampling or reading. A multiplexer 214 is coupled to the PD pixel array 212. The multiplexer 214 transmits pixel state outputs to an off-chip memory array 216. The pixel state outputs are employed as the write enable lines of the off-chip memory array 216 For example, the output of a portion of a row of the PD pixel array 212 or an entire row of the PD pixel array 212 can be multiplexed to the off-chip memory array 216. The off-chip memory array 216 is operative for storing pixel fired time values, and a data writer 218 is operative for writing pixel fired time values into the memory array 216.

A control logic device 222 is coupled to the PD pixel array 212, the row decoder 220, the off-chip memory array 216 and the data writer 218. The control logic device 222 controls the sampling of the PD pixel array 212 using the row decoder 220 and a column decoder (not shown). The control logic device 222 can also control the readout of the PD pixel array 212. The control logic device 222 provides a time associated with firing of pixels to the data writer 218 through a clock, counter or time. The output of the fired pixel can be employed as a write enable line of a respective memory cell in the off-chip memory array 216. The control logic device 222 causes the execution of a raster scan of the PD array 212, and repeats this raster scan until all of the pixels have been determined to be fired, or a predetermined period has expired. Devices that do not fire are assigned a default value and assumed to be dark. Row parallel processing can be combined with the R&AAC readout scheme. M rows in parallel processing will increase the throughout speed by M times. The output data pins will also increase M times.

It is to be appreciated that some rows may have no pixels fired in a bit plane. In another aspect of the invention, a readout scheme is provided that removes the redundancy of the sample time associated with rows that have no pixels fired in a bit plane. A check logic device (not shown) can determine which rows in which all pixels have been fired or where no pixels have been fired to skip reading of that row. Additionally, the check logic device can determine the number of pixels fired and the associated readout time necessary for that row to optimize the required scanning time. The asynchronous R&AAC readout scheme can be employed with this scheme. During the sampling interval, as long as one row is readout, the end mark of this row will trigger the sampling of the next row. For those rows that have many pixel addresses to send out, it will need longer time. But for those rows that have few or even no pixel addresses to send out, it will need less time. The asynchronous scheme can adaptively change the sampling time for each row. The sampling time for one particular row is also different for different images. Therefore, a check logic device can adapt to different images based on the signal dependency of the image.

Figure 12:
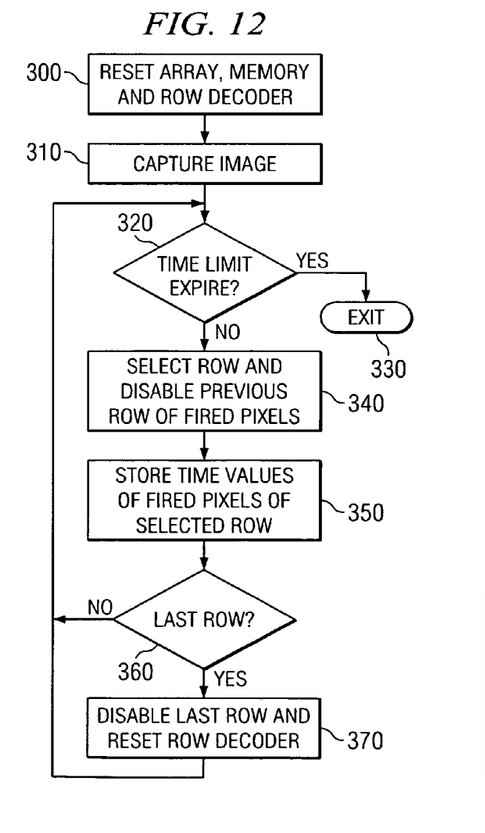
FIG. 12 illustrates a methodology for reading an image from a photodiode pixel array in accordance with an aspect of the present invention.
Figure 13:
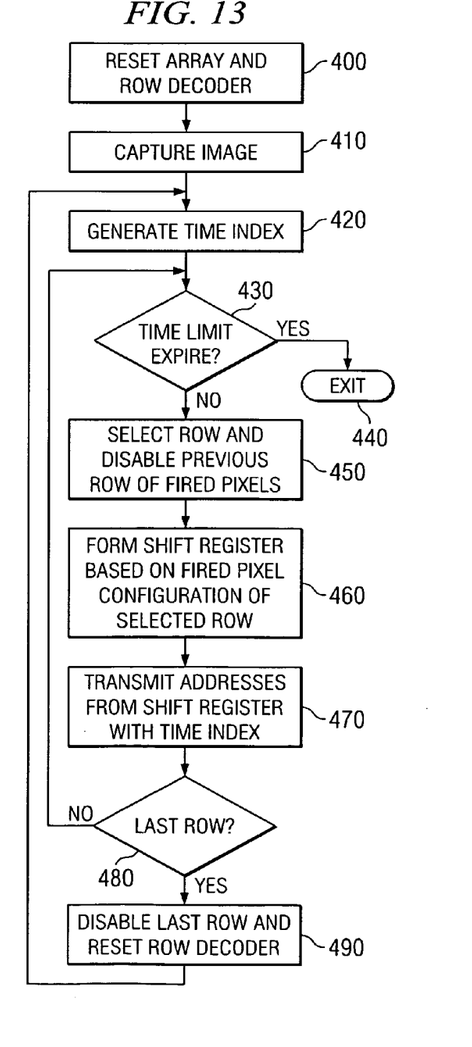
FIG. 13 illustrates a methodology for reading an image from a photodiode pixel array and compressing image data in accordance with an aspect of the present invention.

In view of the foregoing structural and functional features described above, methodologies in accordance with various aspects of the present invention will be better appreciated with reference to FIGS. 12–13. While, for purposes of simplicity of explanation, the methodologies of FIGS. 12–13 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 12 illustrates one particular methodology for reading an image from a PD pixel array in accordance with an aspect of the present invention. The methodology begins at 300 where a PD pixel array, a memory storage array and a row decoder are reset. The pixels of the PD pixel array are reset to an unfired state. The memory locations associated with respective pixels are set to an initial time value T0, while the row decoder is set to the first row of the PD pixel array and the first row of the allocated memory array for storing time values associated with fired pixels. The methodology then proceeds to 310. At 310, an image is captured by the PD pixel array. The methodology then determines if a scanning time limit has expired at 320. The scanning limit can vary depending on the size of the array being scanned. Additionally, the scan can be aborted if it is determined that every pixel in the array has fired. If a scanning time limit has expired (YES) at 320, the methodology exits the routine at 330. If a scanning time limit has not expired (NO) at 320, the methodology proceeds to 340.

At 340, a row is selected for reading of fired pixels and the pixels in the previous row are disabled. A fired pixel can be determined by comparing the photodiode voltage of the pixel with a reference voltage. The reference voltage can be fixed or variable over time. The time values associated with the fired pixels are then stored in memory locations associated with the pixels. The time values can vary based on the time required to scan each row of the PD pixel array. Alternatively, the time values can be similar for each row of a single PD pixel array scan, and the row scanning time compensated for later during decompression and decoding of the image data. The methodology then proceeds to 350. At 350, time values associated with the fired pixels are stored in corresponding memory locations associated with the pixels. Enablement of the fired pixel can be employed as a write enable line to the associated memory location.

The methodology then proceeds to 360 to determine if the last row of the PD pixel array has been scanned. If the last row of the PD pixel array has not been scanned (NO), the methodology returns to 320 to determine if the time limit has expired, and scans the next row at 340. If the last row of the PD pixel array has been scanned (YES), the methodology proceeds to 370. At 370, the fired pixels of the last row of the PD pixel array are disabled and the address decoder is reset. The methodology then returns to 320 to determine if the time limit has expired, and begins another scan of the PD pixel array at 340.

FIG. 13 illustrates one particular methodology for reading an image from a PD pixel array and compressing image data associated with the read image in accordance with an aspect of the present invention. The methodology begins at 400 where a PD pixel array and a row decoder are reset. The pixels of the PD pixel array are reset to an unfired state. The row decoder is set to the first row of the PD pixel array. The methodology then proceeds to 410. At 410, an image is captured by the PD pixel array. At 420, a time index is generated associated with the scan time of the PD pixel array. The time index can then be transmitted to another device separate from the PD pixel array and associated logic. The methodology then determines if a scanning time limit has expired at 430. The scanning limit can vary depending on the size of the array being scanned. Additionally, the scan can be aborted is it is determined that every pixel in the array has fired. If a scanning time limit has expired (YES) at 430, the methodology exits the routine at 440. If a scanning time limit has not expired (NO) at 430, the methodology proceeds to 450.

At 450, a row is selected for reading of fired pixels and the pixels in the previous row are disabled. A fired pixel can be determined by comparing the photodiode voltage of the pixel with a reference voltage. The reference voltage can be fixed or variable over time. The methodology then proceeds to 460. At 460, a shift register is formed based on the fired pixel configuration. The shift register includes one or more flip-flops containing a pixel address associated with the fired pixel configuration. Logic associated with the fired pixel configuration can be employed to couple flip-flops to form the shift register. The logic can include absolute address coding, relative address coding or a combination of absolute and relative address coding to optimize compression of the image data. The methodology then proceeds to 470. At 470, the addresses associated with the selected flip-flops are shifted serially out of the shift register. The addresses can be transmitted to another device separate from the PD array and associated logic.

The methodology then proceeds to 480 to determine if the last row of the PD pixel array has been scanned. If the last row of the PD pixel array has not been scanned (NO), the methodology returns to 430 to determine if the time limit has expired, and scans the next row at 450. If the last row of the PD pixel array has been scanned (YES), the methodology proceeds to 490. At 490, the fired pixels of the last row of the PD pixel array are disabled and the address decoder is reset. The methodology then returns to 420 to generate a new time index associated with a new scan of the PD pixel array.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A CMOS image system comprising:
   a photodiode (PD) array with a plurality of CMOS pixel sensors having an unfired state and a fired state;
   a control logic device that associates a time with the firing of CMOS pixel sensors that achieve the fired state, the time corresponding to the brightness of the illumination received by the respective CMOS pixel sensor; and
   a serial readout device that forms a shift register based on a the fired state configuration of a row of the PD pixel array, the shift register loads addresses corresponding to the CMOS pixel sensors based on the fired state configuration of a row and shifts the addresses serially out of the serial readout device,
   the loaded addresses being based on a combination of an absolute address coding technique and a relative address coding technique, such that the addresses of CMOS pixel sensors in a row having a logic configuration of a "010" state are loaded into the shift register based on absolute address coding where the addresses of fired CMOS pixel sensors are loaded into the shift register and the CMOS pixel sensors in a row having other configurations are loaded into the shift register based on relative address coding where the addresses of CMOS pixel sensors having transient logic states are loaded into the shift register, a distinguish bit being provided in the address to determine if a bit employs one of absolute address coding and relative address coding.

2. The system of claim 1, further comprising a row decoder having a row select device and a disable device, the row select device selects a row of the PD array to be scanned for fired CMOS pixel sensors and the disable device disables CMOS pixel sensors that fired in a previous row.

3. The system of claim 1, at least one CMOS pixel sensor comprising a photodiode and a reference voltage coupled to a comparator, the comparator provides a signal associated with a fired state when a voltage of the photodiode reaches the reference voltage.

4. The system of claim 3, the reference voltage having one of a fixed voltage state and a variable voltage state.

5. The system of claim 3, further comprising a disable circuit operative to disable the comparator after the CMOS pixel sensor has fired.

6. The system of claim 3, further comprising a memory array that holds time values associated with the firing of the CMOS pixel sensors, the memory array having an associated memory location for each CMOS pixel sensor of the PD pixel array.

7. The system of claim 6, the memory array being initialized with default time values prior to a PD array scan.

8. The system of claim 6, the CMOS pixel sensor provides a write enable line to the associated memory location such that a time value is written into the memory location when the CMOS pixel sensor fires.

9. The system of claim 1, the control logic device causes the PD pixel array to be raster scanned repeatedly until a predetermined time period expires.

10. The system of claim 1, the loaded addresses being based on an absolute address coding technique, such that the addresses of fired CMOS pixel sensors are loaded into the shift register.

11. The system of claim 1, the loaded addresses being based on a relative address coding technique, such that the addresses of CMOS pixel sensors having transient logic states are loaded into the shift register.

12. The system of claim 1, further comprising a multiplexer that transmits in parallel a set of addresses of CMOS pixel sensors to an off-chip memory based on a the fired state configuration of a set of CMOS pixel sensors.

13. An imaging system comprising:
a photodiode (PD) pixel array employing time domain sampling, the PD pixel array having a plurality of CMOS pixel sensors arranged in columns and rows, each CMOS pixel sensor having an unfired state and a fired state;
a plurality of D-Flip Flops containing respective column addresses of CMOS pixel sensors of a PD pixel array;
a plurality of register switches corresponding to respective D-Flip Flops of the plurality of D-Flip Flops;
a row select switch bank that couples a row of the PD pixel array to the plurality of register switches, the state of the plurality of register switches being based on a logic state configuration of the row of the PD pixel array, which forms a shift register from selected D-Flip Flops;
a control logic device that controls the selection of rows of the PD pixel array for sampling and shifting addresses of CMOS pixel sensors in a selected row based on the fired state configuration of the selected row; and
a plurality of logic devices configured to load addresses based on a combination of an absolute address technique and relative address coding technique, such that the addresses of CMOS pixel sensors in a row having a logic configuration of a "010" state are loaded into the shift register based on absolute address coding where the addresses of fired CMOS pixel sensors are loaded into the shift register, and the CMOS pixel sensors in a row having other logic configurations are loaded into the shift register based on relative address coding where the addresses of CMOS pixel sensors having transient logic states are loaded into the shift register, a distinguish bit being provided in the address to determine if a bit employs one of absolute address coding and relative address coding.

14. The system of claim 13, the loaded addresses being based on an absolute address coding technique, such that the addresses of fired CMOS pixel sensors are loaded into the shift register.

15. The system of claim 13, further comprising a plurality of logic devices configured to load addresses based on a relative address coding technique, such that the addresses of CMOS pixel sensors having transient logic states are loaded into the shift register.

16. A method for reading image data from a photodiode (PD) pixel array employing time domain sampling, the PD pixel array having a plurality of CMOS pixel sensors that have a fired state and an unfired state, the method comprising:
resetting a PD pixel array;
capturing an image on the PD pixel array;
scanning the PD pixel array for CMOS pixel sensors that have fired;
associating a time index to the CMOS pixel sensors that have fired;
repeating the scanning of the PD pixel array for CMOS pixel sensors and associating a time index to the CMOS pixel sensors that have fired until a predetermined time period expires, the associated time index corresponding to a respective brightness of incident light received by a corresponding CMOS pixel sensor,
the transmitted addresses being based on an absolute address coding technigue, such that the fired pixel configuration is based on addresses of fired CMOS pixel sensors; and
the transmitted addresses being based on a combination of an absolute address technique and relative address coding technique, such that the fired pixel configuration is based on CMOS pixel sensors in a row having a logic configuration of a "010" state employ absolute address coding where the addresses of fired CMOS pixel sensors are transmitted and the CMOS pixel sensors in a row having other logic configurations are transmitted based on relative address coding, such that addresses of CMOS pixel sensor having transient logic states are transmitted.

17. The method of claim 16, the CMOS pixel sensor entering a fired state when a photodiode voltage of the CMOS pixel sensor reaches a reference voltage.

18. The method of claim 16, the scanning the PD pixel array for CMOS pixel sensors that have fired comprising scanning the PD pixel array row by row.

19. The method of claim 18, further comprising disabling fired CMOS pixel sensors of a previous scanned row as a selected row is being scanned.

20. The method of claim 16, further comprising storing the associated time indexes in memory locations associated with corresponding CMOS pixel sensors.

21. The method of claim 16, further comprising transmitting addresses of CMOS pixel sensors based on a fired pixel configuration of the selected row for scanning.

22. The method of claim 21, further comprising multiplexing a parallel set of addresses to an off-chip memory based the fired state configuration of a set of CMOS pixel sensors.

23. The method of claim 16, the transmitted addresses being based on a relative address coding technique, such that the fired pixel configuration is based on CMOS pixel sensors having transient logic states.

* * * * *